United States Patent
Podgorny et al.

(10) Patent No.: US 8,468,110 B1
(45) Date of Patent: Jun. 18, 2013

(54) REAL-TIME USER BEHAVIOR PREDICTION

(75) Inventors: Igor A. Podgorny, San Diego, CA (US); Fedor N. Dzegilenko, San Jose, CA (US); Floyd J. Morgan, Carlsbad, CA (US); Vineet Singh, Cupertino, CA (US); Marc J. Attinasi, Ramona, CA (US); Troy D. Otillio, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 378 days.

(21) Appl. No.: 12/841,831

(22) Filed: Jul. 22, 2010

(51) Int. Cl.
*G06F 17/00* (2006.01)

(52) U.S. Cl.
USPC .......................................................... 706/45

(58) Field of Classification Search
USPC ............................................... 706/12, 45, 62
See application file for complete search history.

(56) References Cited

U.S. PATENT DOCUMENTS

2009/0164395 A1* 6/2009 Heck ................................ 706/16
2011/0238289 A1* 9/2011 Lehmann et al. ............. 701/201

OTHER PUBLICATIONS

Wasserman et al., Logit Models and Logistic regression for social networks: An introduction ro Markov Graphs and p, 1996, Psychometrika, vol. 61, No. 3, pp. 401-425.*

* cited by examiner

*Primary Examiner* — David Vincent
(74) *Attorney, Agent, or Firm* — Park, Vaughan, Fleming & Dowler, LLP; Chia-Hsin Suen

(57) ABSTRACT

The disclosed embodiments provide a system that facilitates use of an application. During operation, the system obtains an activity history of interaction between the user and the application during use of the application by the user. Next, the system applies a predictive model to the activity history to predict a probability of a user action in the application. Finally, the system facilitates subsequent real-time use of the application by the user based on the probability of the user action.

24 Claims, 4 Drawing Sheets

REAL-TIME USER BEHAVIOR PREDICTION

RELATED APPLICATION

The subject matter of this application is related to the subject matter in a co-pending non-provisional application by inventors Igor Podgorny, Fedor Dzegilenko, Martha Fiske, Jason Greschler and Floyd Morgan and filed on the same day as the instant application entitled "Question Prioritization in Community-Driven Question-and-Answer Systems," having U.S. patent application Ser. No. 12/841,821, and filing date, Jul. 22, 2010.

The subject matter of this application is also related to the subject matter in a co-pending non-provisional application by inventors Marc Attinasi, Igor Podgorny, Fedor Dzegilenko, Floyd Morgan, Vineet Singh and Troy Otillio and filed on the same day as the instant application entitled "Real-Time Tracking of User-Application Interaction," having U.S. patent application Ser. No. 12/841,838, and filing date, Jul. 22, 2010.

BACKGROUND

Related Art

The present embodiments relate to techniques for facilitating use of application software for a computer system.

Application software may be used to perform tasks of varying duration and complexity. Furthermore, different amounts of user input and/or interaction with the software may be required to complete the tasks. For example, a user may spend several hours entering information into a tax preparation application to prepare and file his/her taxes, several minutes on an email client to send and receive emails, and/or several seconds starting and setting up a media player to play music. User experiences with an application may also vary based on the application's complexity, the user's familiarity with the application, and/or the domain of the application. For example, an accountant may find a tax preparation application to be simple or straightforward to use, while a user unfamiliar with tax law may find the same tax preparation application to be unusable.

Intelligent user interface design can facilitate interaction between an application and users of varying ability levels. For example, complex applications may include tutorials that explain the use of various features in the applications to the user. Use of help and/or support features may also improve a user's understanding of an application's user interface. For example, a user may browse or search an index of help topics to understand a confusing feature and/or part of an application. The user may also post questions on online forums to obtain support from customer care specialists and/or more advanced users of the application.

Similarly, the user may also choose between different versions of an application's user interface based on the user's aptitude in using the application. In addition, applications such as computer games and standardized tests may modulate the difficulty of the task at hand (e.g., game play, answering test questions, etc.) based on the precision, accuracy, and/or correctness of the user's input to the applications.

Finally, user issues with the user interface of an application may be identified and used to improve the user interface. For example, exit surveys and/or other user feedback may be used by application designers or architects to determine problematic areas with an application and/or to predict real-time user behavior with the product.

SUMMARY

The disclosed embodiments provide a system that facilitates use of an application. During operation, the system obtains an activity history of interaction between the user and the application during use of the application by the user. Next, the system applies a predictive model to the activity history to predict a probability of a user action in the application. Finally, the system facilitates subsequent real-time use of the application by the user based on the probability of the user action.

In some embodiments, applying the predictive model to the activity history to predict the probability of the user action involves obtaining values for a set of variables in the predictive model from the activity history, and evaluating a function from the predictive model using the values.

In some embodiments, the predictive model is a logit model.

In some embodiments, the set of variables includes at least one of a ratio of unique page clicks to total page clicks, an inverse coefficient of variation, a number of interactions with a question-and-answer system, an existing-user status, a trial-user status, and an availability of an email address for the user.

In some embodiments, the user action is at least one of discontinued use of the application and use of technical support for the application.

In some embodiments, facilitating subsequent real-time use of the application by the user based on the probability of the user action involves assisting the user with use of the application if a targeted profit associated with the probability of the user action is higher than an untargeted profit associated with the probability of the user action.

In some embodiments, the targeted profit is based on a cost of assisting the user with use of the application and a first number of users adopting the application, and the untargeted profit is based on a second number of users adopting the application.

In some embodiments, assisting the user with use of the application involves at least one of advising the user to use a question-and-answer system associated with the application, and prioritizing a question submitted by the user to the question-and-answer system.

BRIEF DESCRIPTION OF THE FIGURES

In the figures, like reference numerals refer to the same figure elements.

DETAILED DESCRIPTION

Figure 1:
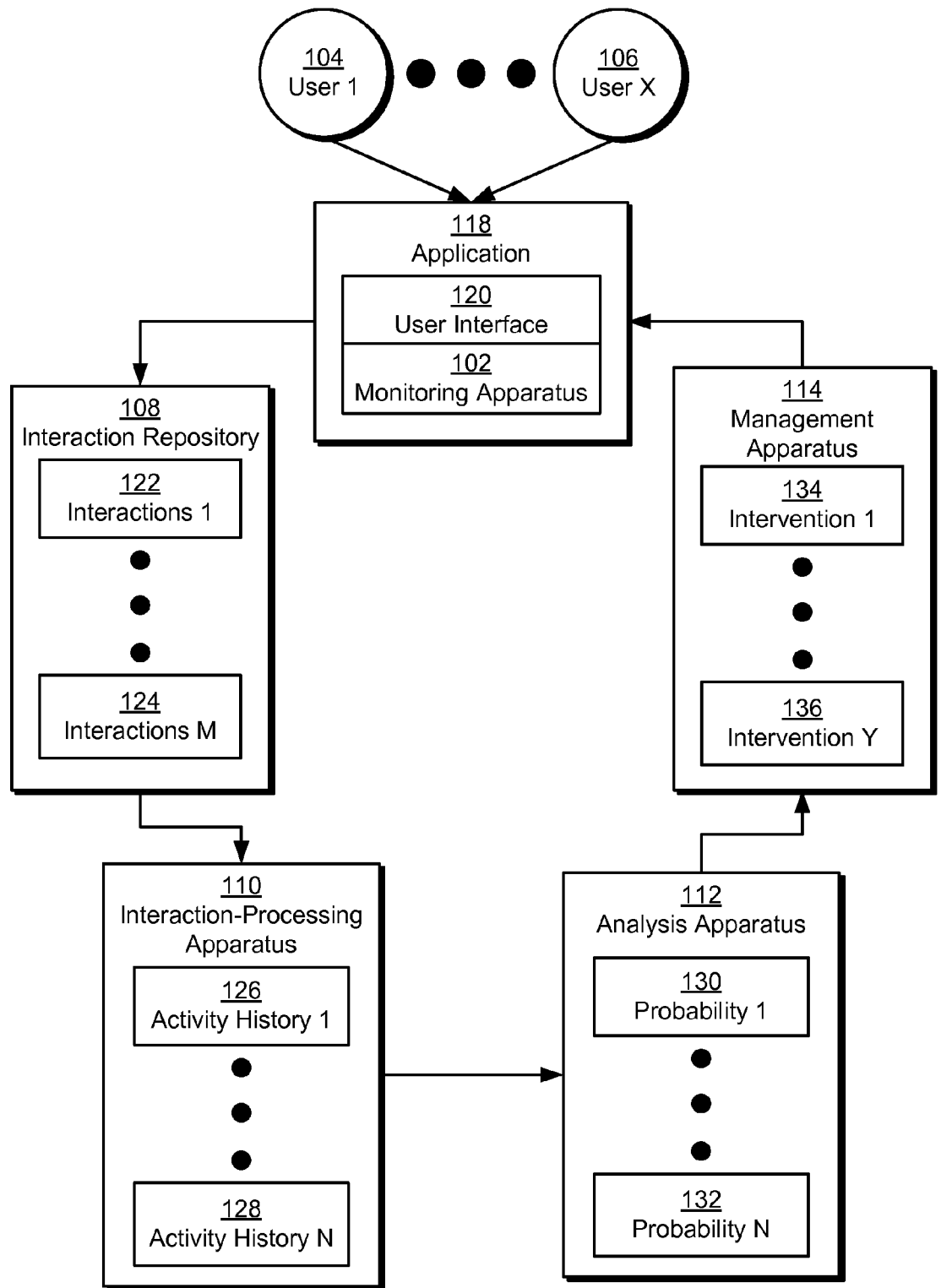
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating use of an application. The application may correspond to application software such as a word processor, an email client, a web browser, a web application, and/or a tax preparation application. The application may be used to perform one or more tasks for a user of the application. For example, the application may allow the user to create documents, display web pages, and/or prepare tax forms. Moreover, the user may interact with the application through the application's user interface.

More specifically, embodiments provide a method and system for detecting and mitigating the potential occurrence of certain user actions in the application. First, an activity history of interaction between a user and the application may be obtained during use of the application by the user. The activity history may include up-to-date statistics and/or data related to interactions between the user and the application.

Next, a predictive model may be applied to the activity history to predict a probability of a user action in the application. The predictive model may be a logit model that includes a logistic function. To predict the probability, values for the variables may be obtained from the activity history, and the function may be evaluated using the values. For example, the activity history may include values for variables such as a ratio of unique page clicks to total page clicks, an inverse coefficient of variation, a number of interactions with a question-and-answer (Q&A) system associated with the application, an existing-user status, a trial-user status, an availability of an email address for the user, and/or key words or phrases from the user's text input to the application.

Subsequent real-time use of the application by the user may then be facilitated based on the probability of the user action. In particular, a targeted profit and an untargeted profit for a target group of users containing the user may be calculated. The targeted profit may be based on the cost of assisting each user with use of the application and a first number of users adopting the application after assistance is offered to the target group, while the untargeted profit may be based on a second number of users adopting the application without offering assistance to the target group. The user may then be assisted with use of the application if the target profit is higher than the untargeted profit. For example, the user may be advised to use a question-and-answer system associated with the application, or questions submitted by the user to the question-and-answer system may be prioritized.

FIG. 1 shows a schematic of a system in accordance with an embodiment. The system includes a monitoring apparatus 102, an interaction-processing apparatus 110, an analysis apparatus 112, and a management apparatus 114. Each of these components is discussed in further detail below.

In one or more embodiments, the system of FIG. 1 is used to monitor and facilitate the use of an application 118 by a set of users (e.g., user 1 104, user x 106). Application 118 may correspond to a software program that is executed by a computing device, such as a personal computer (PC), laptop computer, mobile phone, portable media player, and/or server computer. For example, application 118 may be a word-processing application, an email client, an operating system, an accounting application, a web application, and/or a web browser. Application 118 may be distributed across one or more machines and accessed in various ways. For example, application 118 may be installed on a personal computer (PC) and executed through an operating system on the PC.

Moreover, application 118 may be implemented using a client-server architecture. Application 118 may be executed on one or more servers and accessed from other machines using a locally installed executable and/or a web browser and network connection. In other words, application 118 may be implemented using a cloud computing system that is accessed over the Internet. Regardless of the method of access, interaction between application 118 and the users may be facilitated through a user interface 120.

In particular, interactions (e.g., interactions 1 122, interactions m 124) between the users and application 118 may be enabled by user interface 120. For example, the users may provide interactive input (e.g., page clicks, text input, file uploads, gestures, etc.) to application 118 through a graphical user interface (GUI) provided by application 118 and view text, images, documents, menus, icons, form fields, webpages, and/or other elements of application 118 through the same GUI. Those skilled in the art will appreciate that other types of user interfaces, such as command line interfaces and/or web-based user interfaces, may also be used by application 118. Thus, application 118 is able to perform tasks by receiving input from and providing output to the users through user interface 120.

Those skilled in the art will appreciate that a user's overall experience with application 118 may be affected by factors such as the user's familiarity with application 118, the user's knowledge of the domain of application 118, and/or the complexity or design of application 118. For example, the user may find a web browser to be easy or straightforward to use and a tax preparation application difficult or confusing to use. On the other hand, an accountant may have greater ease in using a tax preparation application than a user who is unfamiliar with accounting and/or tax preparation principles.

Furthermore, a user's experience with application 118 may affect his/her subsequent use of the application. For example, a user of a "try before you buy" application may choose not to purchase the application after experiencing difficulty and/or boredom with the application. Along the same lines, a user may incur additional costs from contacting technical support if the user cannot understand or use a feature of the application.

As described above, the system of FIG. 1 includes functionality to monitor and/or facilitate the use of application 118. First, monitoring apparatus 102 may track interactions between one or more users and application 118. The interactions may correspond to page clicks and/or text input from the users. For example, monitoring apparatus 102 may track the users' navigation through the webpages of a web application and/or form submissions to the web application. In addition, monitoring apparatus 102 may be implemented and/or provided by application 118 to enable tracking of the interactions in real-time from application 118.

Moreover, monitoring apparatus 102 may track the interactions without impacting the performance of application 118. Monitoring apparatus 102 may begin by tracking the interactions of a small set of users with application 118 and concurrently monitoring the performance of application 118. Afterwards, monitoring apparatus 102 may incrementally select additional users for tracking if a performance requirement is met by application 118. On the other hand, monitoring apparatus 102 may remove one or more users from tracking if the performance requirement is not met by application 118. Consequently, monitoring apparatus 102 may modulate the tracking of users in a way that maintains both the performance of application 118 and maximizes the number of tracked users.

Next, monitoring apparatus 102 may store the interactions in an interaction repository 108 as the interactions are detected. For example, upon detecting an interaction between a user and application 118, monitoring apparatus 102 may push a piece of data identifying the user and the interaction to a relational database and/or queue corresponding to interaction repository 108. As a result, interaction repository 108 may maintain a record of interactions between the user and application 118 at a latency that is low enough (e.g., on the order of milliseconds) to be real-time.

The stored interactions in interaction repository 108 may then be processed by interaction-processing apparatus 110 to obtain a set of activity histories (e.g., activity history 1 126, activity history n 128) for the users. Interaction-processing apparatus 110 may be external to application 118 to further reduce the performance impact associated with tracking users of application 118. For example, application 118, interaction repository 108, and interaction-processing apparatus 110 may reside on three different servers. As a result, the operation of interaction repository 108 and/or interaction-processing apparatus 110 may have little to no effect on the operation of application 118 and/or monitoring apparatus 102.

In one or more embodiments, interaction-processing apparatus 110 obtains an activity history for a user by periodically processing a subset of the stored interactions associated with the user in interaction repository 108. The activity history may include data and/or statistics related to the stored interactions for the corresponding user. For example, the activity history may include a ratio of unique page clicks to total page clicks, an inverse coefficient of variation, a number of interactions with a question-and-answer (Q&A) system associated with application 118, an existing-user status, a trial-user status, an availability of an email address for the user, and/or key words or phrases from the user's text input to application 118.

More specifically, processing of the subset of the stored interactions may be triggered upon detecting a pre-specified number of interactions between the user and application 118 and/or during a key stage of interaction between the user and application 118. For example, interaction processing apparatus 110 may process the subset of interactions (e.g., interactions 1 122) in interaction repository 108 associated with the user (e.g., user 1 104) to obtain and/or update the activity history (e.g., activity history 1 126) after the user performs 20, 40, or 100 interactions with application 118. Interaction-processing apparatus 110 may additionally obtain and/or update the activity history during initial use of application 118, purchase of application 118, and/or use of a complex feature in application 118 by the user. Tracking and processing of user application interaction in real-time is discussed in a co-pending non-provisional application by inventors Marc Attinasi, Igor Podgorny, Fedor Dzegilenko, Floyd Morgan, Vineet Singh and Troy Otillio and filed on the same day as the instant application entitled "Real-Time Tracking of User-Application Interaction," having U.S. patent application Ser. No. 12/841,838, and filing date, Jul. 22, 2010, which is incorporated herein by reference.

The activity history may then be used to facilitate subsequent real-time use of application 118 by the user. In particular, analysis apparatus 112 may apply a predictive model to the activity history to predict a probability (e.g., probability 1 130, probability n 132) of a user action in application 118 by the user. The user action may correspond to discontinued use of application 118 and/or use of technical support for application 118.

Analysis apparatus 112 and/or management apparatus 114 may then modify the probability by assisting the user with use of application 118. For example, analysis apparatus 112 and/or management apparatus 114 may increase use and/or adoption of application 118 by decreasing the probability of discontinued use of the application by the user. Similarly, analysis apparatus 112 and/or management apparatus 114 may reduce costs for both the user and the administrators (e.g., designers, engineers, support staff) of application 118 by decreasing the probability of using technical support for application 118 by the user.

To modify the probability, analysis apparatus 112 and/or management apparatus 114 may use the predictive model, activity history, and/or probability to determine if the user should or should not be targeted with assisted use of application 118. For example, analysis apparatus 112 may use a logit model to predict each user's probability of discontinuing use of application 118 before the user purchases application 118. Analysis apparatus 112 may also calculate a targeted profit and an untargeted profit for one or more target groups of users (e.g., decile or percentile of probabilities). The targeted profit may be based on the cost of assisting each user with use of application 118 and a first number of users adopting application 118 after assistance is offered to the target group, while the untargeted profit may be based on a second number of users adopting application 118 without offering assistance to the target group.

The target group may be then be targeted with assisted use of application 118 if the targeted profit is higher than the untargeted profit. In other words, the user may be targeted if the user is in a target group that responds positively to assisted use of application 118 (e.g., adopts application 118 because of the assisted use). On the other hand, the user may not be targeted if the user is in a target group that responds neutrally or negatively (e.g., discontinues use of application 118 because or in spite of the assisted use). Targeting of users based on analysis of monitored interactions is discussed in further detail below with respect to FIG. 2.

If analysis apparatus 112 finds a target group that responds positively to assisted use of application 118, management apparatus 114 may generate an intervention (e.g., intervention 1 134, intervention y 136) for each user in the target group. The intervention may assist the user with use of application 118 by advising the user to use the Q&A system associated with application 118. For example, the intervention may be provided and/or displayed through application 118 as an email and/or pop-up window and may include a link to the Q&A system, as well as a message suggesting that the user obtain assistance by submitting a question to the Q&A system.

The intervention may also prioritize questions submitted by the user to the Q&A system. Prioritization of questions in Q&A systems is discussed in a co-pending non-provisional application by inventors Igor Podgorny, Fedor Dzegilenko, Martha Fiske, Jason Greschler and Floyd Morgan and filed on the same day as the instant application entitled "Question Prioritization in Community-Driven Question-and-Answer Systems," having U.S. patent application Ser. No. 12/841, 821, and filing date, Jul. 22, 2010, which is incorporated herein by reference.

As discussed above, the system of FIG. 1 may be used to detect and mitigate the potential occurrence of user actions in application 118. As a result, users may be tracked based on the occurrence and/or possibility of the user actions. For example, monitoring apparatus 102 may remove a user from tracking after the user adopts application 118, discontinues use of application 118, and/or uses technical support for application 118. Similarly, users associated with very low and/or high probabilities of user actions may be removed from tracking because the probabilities are unlikely to change much after such users are targeted with assisted use of application 118.

Consequently, the system of FIG. 1 may increase the usability and adoption of application 118 while reducing costs associated with the purchase and/or support of application 118. In particular, monitoring the use of application 118 may facilitate the identification of users who have difficulties with using application 118. At the same time, the monitoring may be performed in a way that both maintains performance in application 118 and allows for the tracking of a relatively large number of users in real-time. Finally, analysis of the monitored interactions may enable the users to be targeted before the users discontinue use of application 118 and/or use technical support for application 118, thus increasing revenue associated with adoption of application 118 and decreasing user and support costs associated with use of technical support for application 118.

Figure 2:
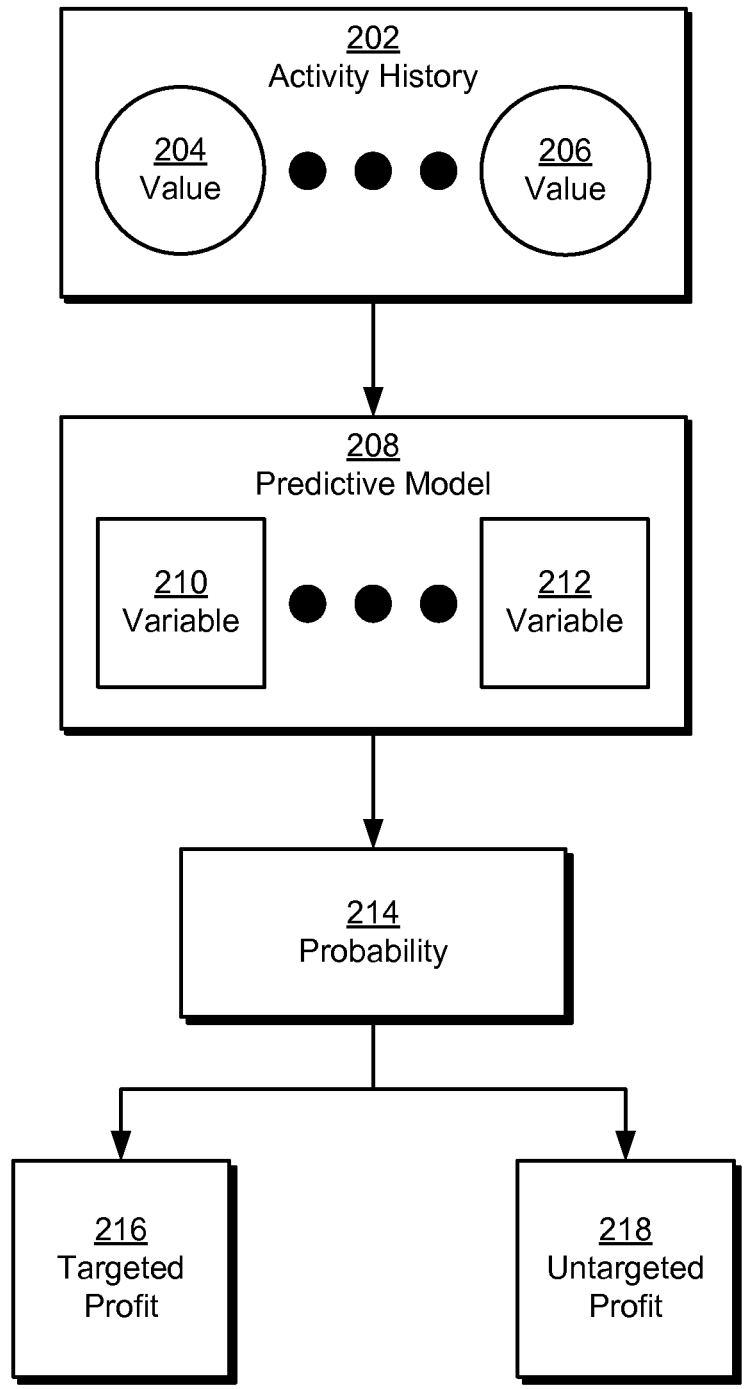
FIG. 2 shows an exemplary use of a predictive model to predict a probability of a user action in accordance with an embodiment.

FIG. 2 shows an exemplary use of a predictive model 208 to predict a probability 214 of a user action in accordance with an embodiment. As mentioned previously, predictive model 208 may be applied to an activity history 202 of interaction between a user and an application (e.g., application 118 of FIG. 1) to obtain probability 214. In addition, activity history 202 may include a set of values 204-206 for a set of variables 210-212 in predictive model 208.

In particular, activity history 202 may include values 204-206 for variables 210-212 related to the navigation and/or use of the application by the user. In particular, activity history 202 may include a ratio of unique page clicks to total page clicks, an inverse coefficient of variation, a number of interactions with a Q&A system associated with the application, an existing-user status, a trial-user status, an availability of an email address for the user, and/or key words or phrases from the user's text input to the application.

The ratio of unique page clicks to total page clicks may represent the user's pattern of navigating through the application. A higher ratio may indicate a higher proportion of unique page visits, and a lower ratio may indicate a higher proportion of repeated page visits. For example, a user that clicks through five pages of the application in consecutive order may have a ratio of unique page clicks to total page clicks of 5:5, or 1. On the other hand, a user that performs five page clicks back and forth between two pages (e.g., first page, second page, first page, second page, first page) may have a ratio of unique page clicks to total page clicks of only 2:5. A user with a low ratio of unique page clicks to total page clicks may thus be confused by the application and have a higher probability 214 of discontinuing use of the application or using technical support for the application than a user with a high ratio of unique page clicks to total page clicks.

The inverse coefficient of variation may correspond to a ratio of the user's mean time delay between consecutive page clicks to the standard deviation of the user's time delays. As a result, a higher inverse coefficient of variation may indicate less fluctuation in the user's time delays than a lower inverse coefficient of variation. Moreover, the inverse coefficient of variation may have a greater effect on the probability of the user action during initial use of the application than in later stages of interaction between the user and the application. For example, a low inverse coefficient of variation from a new user of the application may indicate a risk of subsequently discontinuing use of the application, while a low inverse coefficient of variation for an existing user of the application may not correlate strongly with discontinued use of the application.

The number of interactions with the Q&A system may represent the number of questions submitted by the user to the Q&A system, as well as the number of answers to the questions received by the user. For example, the user may have five interactions with the Q&A system if the user submits three questions to the Q&A system and receives answers to two of the questions.

The existing-user status may indicate if the user is a new user or an existing user of the application. For example, a new user of a tax-preparation application may be using the tax-preparation application to prepare and file tax returns for the first time, while an existing user of the tax-preparation application may have prepared and filed tax returns using the tax-preparation in previous tax years. A new user may be represented by a value of 0 (e.g., boolean false), while an existing user may be represented by a value of 1 (e.g., boolean true).

The trial-user status may also include a boolean value (e.g., flag) that specifies if the user is using the application anonymously. For example, a "trial-user flag" may be set if a user is interacting with a tax-preparation application without creating a user account and cleared if the user has a user account. The absence of a user account may indicate that the corresponding user is more likely to discontinue use of the application than a non-anonymous user.

As with the existing-user status and trial-user status, the availability of an email address for the user may be represented by a boolean value, in which a user who provides an email address to the application is represented by a value of 1 and a user who does not provide an email address is represented by a value of 0. Furthermore, variables for both the existing-user status and availability of an email address may have a greater effect on probability 214 during initial use of the application by the user than at later stages of interaction with the application.

Finally, key words and/or phrases from the user's text input to application 118 may be identified using boolean and/or numeric values. For example, questions submitted by the user to the Q&A system may be parsed to find words (e.g., "difficult," "confusing," "give up," "quit," etc.) that indicate that the user is having difficulty using the application.

As described above, predictive model 208 may be a logit model. As a result, predictive model 208 may include a logistic function of the following form:

$$P_i = \frac{\exp(\alpha + \beta_1 x_{i1} + \beta_2 x_{i2} + \ldots + \beta_k x_{ik})}{1 + \exp(\alpha + \beta_1 x_{i1} + \beta_2 x_{i2} + \ldots + \beta_k x_{ik})}$$

Within the function, Pi may represent probability 214 for the $i^{th}$ user, $\alpha$ may represent the intercept of the function, $\beta_1$ through $\beta_k$ may represent the coefficients of the function, and $x_{i1}$ through $x_{ik}$ may be values 204-206 of variables 210-212 for the $i^{th}$ user.

The logit model may be trained using historical data collected from users of the application. For example, interactions between a random set (e.g., 10,000) of users and the application may be tracked for a period of time (e.g., four days, ten days, continuously, etc.) to collect information related to the use of the application. User actions (e.g., adoption, discontinued use, use of technical support, etc.) and/or revenue associated with the application may also be determined from the tracked interactions and/or another source of user data (e.g., a database) associated with the application.

The logit model may then be fit to the historical data by determining the values of the intercept $\alpha$ and the coefficients $\beta_1$ through $\beta_k$ based on the tracked interactions and the resultant user actions. In addition, only interactions that affect the user actions may be included in the logit model. As a result, interactions tracked from a user that occur after the user performs a user action may not be used to train the logit model.

To obtain probability 214, values 204-206 for variables 210-212 in predictive model 208 may be obtained from activity history 202, and the logistic function from predictive model 208 may be evaluated using values 204-206. For example, the user's probability 214 of discontinuing use of the application after 10 interactions (e.g., page clicks) may be calculated by obtaining the following values 204-206 for variables 210-212 from activity history 202: a ratio of unique page clicks to total page clicks of 0.2, an inverse coefficient of variation of 0.5, a number of interactions with the Q&A system of 5, an availability of an email address of 1, and an existing-user status of 0. Values 204-206 may then be passed as inputs to the logistic function, which may contain an intercept value of 0.0254 and respective coefficient values for variables 210-212 of −0.4835, 0.7067, 0.1985, −0.3283, and −0.1470. In other words, a value of 0.72 for probability 214 may be obtained by evaluating the following expression:

exp(0.0254−0.4835×0.2+0.7067×0.5+0.1985×5−
0.3283×1−0.1470×0)/(1+exp(0.0254−0.4835×
0.2+0.7067×0.5+0.1985×5−0.3283×1−0.1470×
0))

The logistic function may additionally include different intercept and/or coefficient values for evaluating probability 214 after other pre-specified numbers of interactions between the user and the application. For example, after 200 interactions, coefficients for the inverse coefficient of variation, email availability, and/or user status variables may be set to 0 because of a diminishing statistical significance of the variables over time. On the other hand, the coefficient for the ratio of unique page clicks to total page clicks may be set to −0.35825, and the coefficient for the number of interactions with the Q&A system may be set to 0.0389 after 200 interactions. As a result, the ratio of unique page clicks to total page clicks may become the most statistically significant variable after 200 interactions.

Those skilled in the art will appreciate that a variety of predictive models may be used to predict probabilities of events or outcomes. Consequently, the functionality of predictive model 208 may be provided by a Bayes classifier, k-nearest-neighbor classifier, support vector machine, artificial neural network, and/or other statistical data model.

Activity history 202, predictive model 208, and probability 214 may then be used to calculate a targeted profit 216 and an untargeted profit 218 for one or more target groups containing the user. Each target group may contain users of a specific decile and/or percentile range of probabilities. For example, a user with a value of 0.75 for probability 214 may be in a target group of the top 30% (e.g., $70^{th}$ percentile and above) of users but may not be in target groups of the top 20% (e.g., $80^{th}$ percentile and above) and 10% (e.g., $90^{th}$ percentile and above) of users. Conversely, a user with a value of 0.95 for probability 214 may be in all three target groups.

In one or more embodiments, targeted profit 216 is based on a cost of assisting the user with use of the application and a first number of users adopting the application after assistance is offered to the target group, and untargeted profit 218 is based on a second number of users adopting the application without offering assistance to the target group. Moreover, the user may be targeted with assisted use of the application if targeted profit 216 is higher than untargeted profit 218.

In particular, targeting users with assisted use of the application may cause the users to respond positively by adopting the application, negatively by discontinuing use of the application, and/or neutrally by not modifying their behavior after targeting. As a result, targeted profit 216 may be increased by targeting more users who respond positively and fewer users who respond negatively.

For example, the application may include 10,000 users, of which 50% are expected to adopt the application, 50% are expected to discontinue use of the application, 10% (e.g., 2,000) respond positively to targeting, and 10% respond negatively to targeting. In addition, targeting each user may cost $2, and $10 in revenue may be made from every user who adopts the application. If 1,000 users are targeted randomly, half the users may be expected to adopt the application and half may be expected to discontinue use of the application, because the number of positive responders is expected to equal the number of negative responders. The targeted profit for each user may thus be $3, or the revenue per person (e.g., 500/1,000 users multiplied by $10=$5) minus the cost of targeting each person (e.g., $2). However, because the untargeted profit may be made without incurring the cost of targeting the users, the untargeted profit may simply equal the $5 revenue per person, which is higher than the targeted profit.

However, if 1,000 users with the highest decile (e.g., $90^{th}$ percentile and above) of values for probability 214 are targeted, 80% of the targeted users may be expected to adopt the application, while 20% may be expected to discontinue use of the application. In turn, the targeted profit may be $8 per person (e.g., 800/1,000 users multiplied by $10) minus the $2 cost of targeting, or $6. Because the targeted profit of $6 is higher than the untargeted profit of $5, users in the highest decile of values for probability 214 may be assisted with use of the application. In other words, activity history 202 and predictive model 208 may enable the targeting of users in a way that increases both use of the application and revenue from adoption of the application.

Figure 3:
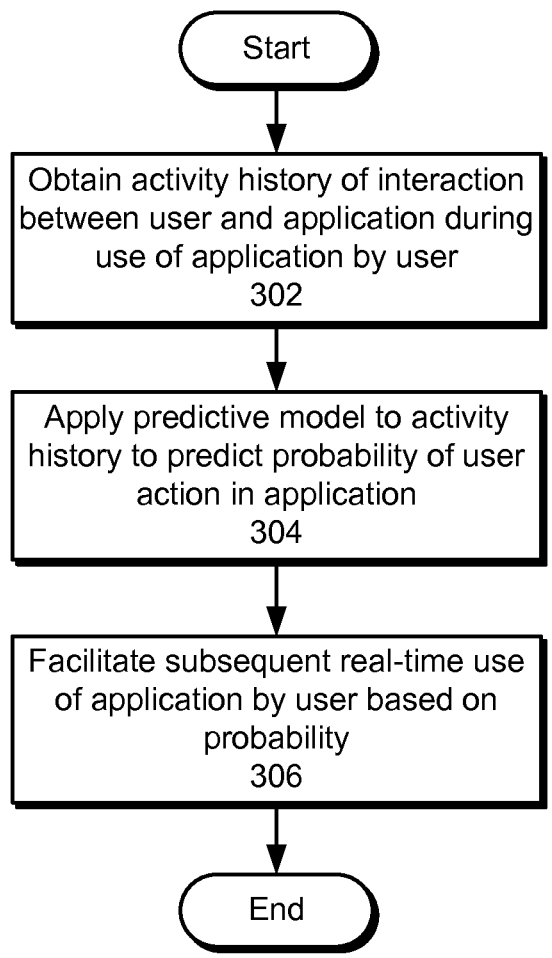
FIG. 3 shows a flowchart illustrating the process of facilitating use of an application in accordance with an embodiment.

FIG. 3 shows a flowchart illustrating the process of facilitating use of an application in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, an activity history of interaction between a user and an application is obtained during use of the application by the user (operation 302). The activity history may be obtained by monitoring the interactions in real-time and processing the interactions upon detecting a pre-specified number of interactions between the user and the application and/or during a key stage of interaction between the user and the application.

Next, a predictive model is applied to the activity history to predict a probability of a user action in the application (operation 304). The predictive model may be trained, validated, and/or refined using historical data (e.g., activity histories) collected from users of the application. The user action may correspond to discontinued use of the application and/or use of technical support for the application. The probability may be predicted by obtaining values for a set of variables in the predictive model (e.g., logit model) from the activity history and evaluating a function (e.g., logistic function) from the predictive model using the values.

Finally, subsequent real-time use of the application by the user is facilitated based on the probability (operation 306). In particular, the user may be assisted with use of the application if a targeted profit associated with the probability is higher than an untargeted profit associated with the probability. The targeted profit may be based on a cost of assisting the user with use of the application and a first number of users adopting the application after assistance is offered to the target group, and the untargeted profit may be based on a second number of users adopting the application without offering assistance to the target group. For example, the user may be assisted with use of the application if the user is in a target group of users who respond well enough to assisted use of the application to more than offset the cost of targeting the users.

Moreover, assisting the user with use of the application may be accomplished by advising the user to use a Q&A system associated with the application and/or prioritizing a question submitted by the user to the Q&A system. For example, the user may receive an email and/or view a pop-up window containing a message that recommends use of a web-based Q&A system for the application. The message may also include a link to the Q&A system. Alternatively, if the user already uses the Q&A system, the user's questions in the Q&A system may be prioritized to enable faster receipt of the answers by the user.

Figure 4:
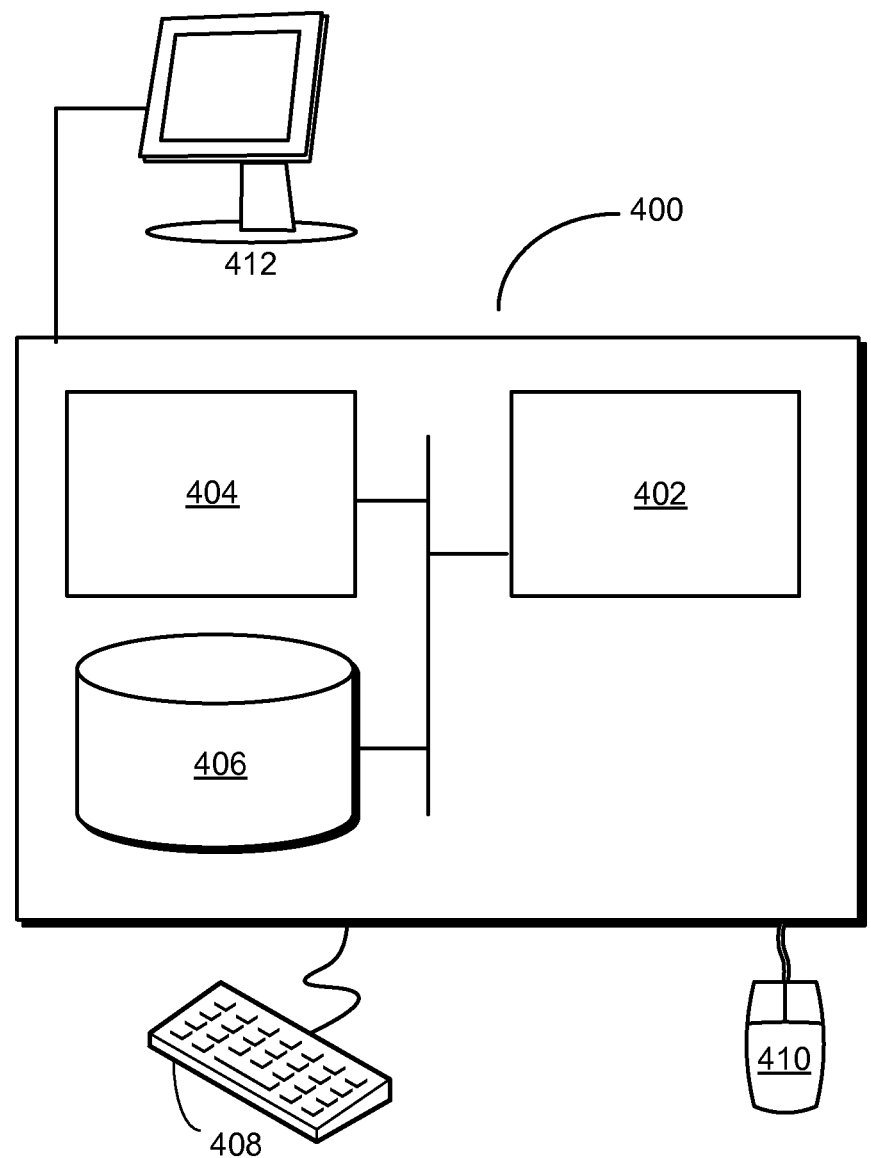
FIG. 4 shows a computer system in accordance with an embodiment.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a system for facilitating use of an application by a user. The system may include an analysis apparatus that obtains an activity history of interaction between the user and the application during use of the application by the user. The analysis apparatus may also apply a predictive model to the activity history to predict a probability of a user action in the application. The system may also include a management apparatus that facilitates subsequent real-time use of the application by the user based on the probability of the user action.

In addition, one or more components of computer system 400 may be remotely located and connected to the other components over a network. Portions of the present embodiments (e.g., analysis apparatus, management apparatus, etc.) may also be located on different nodes of a distributed system that implements the embodiments. For example, the present embodiments may be implemented using a cloud computing system that facilitates use of an application by a set of users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating use of an application by a user, comprising:
   obtaining an activity history of interaction between the user and the application during use of the application by the user;
   applying a predictive model to the activity history to predict a probability of a user action in the application, wherein said applying involves obtaining values for a set of variables in the predictive model from the activity history, wherein the set of variables comprise at least one of:
      an inverse coefficient of variation,
      a number of interactions with a question-and-answer system, and
      a trial-user status; and
   facilitating subsequent real-time use of the application by the user based on the probability of the user action.

2. The computer-implemented method of claim 1, wherein applying the predictive model to the activity history to predict the probability of the user action further involves:
   evaluating a function from the predictive model using the values.

3. The computer-implemented method of claim 2, wherein the predictive model is a logit model.

4. The computer-implemented method of claim 1, wherein the set of variables further comprise at least one of:
   a ratio of unique page clicks to total page clicks;
   an existing-user status; and
   an availability of an email address for the user.

5. The computer-implemented method of claim 1, wherein the user action is at least one of:
   discontinued use of the application; and
   use of technical support for the application.

6. The computer-implemented method of claim 1, wherein facilitating subsequent real-time use of the application by the user based on the probability of the user action involves:
   assisting the user with use of the application if a targeted profit associated with the probability of the user action is higher than an untargeted profit associated with the probability of the user action.

7. The computer-implemented method of claim 6,
wherein the targeted profit is based on a cost of assisting the user with use of the application and a first number of users adopting the application, and
wherein the untargeted profit is based on a second number of users adopting the application.

8. The computer-implemented method of claim 6, wherein assisting the user with use of the application involves at least one of:
advising the user to use a question-and-answer system associated with the application; and
prioritizing a question submitted by the user to the question-and-answer system.

9. A system for facilitating use of an application by a user, comprising:
an analysis apparatus configured to:
obtain an activity history of interaction between the user and the application during use of the application by the user; and
apply a predictive model to the activity history to predict a probability of a user action in the application, wherein said applying involves obtaining values for a set of variables in the predictive model from the activity history, wherein the set of variables comprise at least one of:
an inverse coefficient of variation,
a number of interactions with a question-and-answer system, and
a trial-user status; and
a management apparatus configured to facilitate subsequent real-time use of the application by the user based on the probability of the user action.

10. The system of claim 9, wherein applying the predictive model to the activity history to predict the probability of the user action further involves:
evaluating a function from the predictive model using the values.

11. The system of claim 10, wherein the predictive model is a logit model.

12. The system of claim 9, wherein the set of variables further comprise at least one of:
a ratio of unique page clicks to total page clicks;
an existing-user status; and
an availability of an email address for the user.

13. The system of claim 9, wherein the user action is at least one of:
discontinued use of the application; and
use of technical support for the application.

14. The system of claim 9, wherein facilitating subsequent real-time use of the application by the user based on the probability of the user action involves:
assisting the user with use of the application if a targeted profit associated with the probability of the user action is higher than an untargeted profit associated with the probability of the user action.

15. The system of claim 14,
wherein the targeted profit is based on a cost of assisting the user with use of the application and a first number of users adopting the application, and
wherein the untargeted profit is based on a second number of users adopting the application.

16. The system of claim 14, wherein assisting the user with use of the application involves at least one of:
advising the user to use a question-and-answer system associated with the application; and
prioritizing a question submitted by the user to the question-and-answer system.

17. A non-transitory computer-readable storage medium storing instructions that when executed by a computer cause the computer to perform a method for facilitating use of an application by a user, the method comprising:
obtaining an activity history of interaction between the user and the application during use of the application by the user;
applying a predictive model to the activity history to predict a probability of a user action in the application, wherein said applying involves obtaining values for a set of variables in the predictive model from the activity history, wherein the set of variables comprise at least one of:
an inverse coefficient of variation,
a number of interactions with a question-and-answer system, and
a trial-user status; and
facilitating subsequent real-time use of the application by the user based on the probability of the user action.

18. The non-transitory computer-readable storage medium of claim 17, wherein applying the predictive model to the activity history to predict the probability of the user action further involves:
evaluating a function from the predictive model using the values.

19. The non-transitory computer-readable storage medium of claim 18, wherein the predictive model is a logit model.

20. The non-transitory computer-readable storage medium of claim 17, wherein the set of variables further comprise at least one of:
a ratio of unique page clicks to total page clicks;
an existing-user status; and
an availability of an email address for the user.

21. The non-transitory computer-readable storage medium of claim 17, wherein the user action is at least one of:
discontinued use of the application; and
use of technical support for the application.

22. The non-transitory computer-readable storage medium of claim 17, wherein facilitating subsequent real-time use of the application by the user based on the probability of the user action involves:
assisting the user with use of the application if a targeted profit associated with the probability of the user action is higher than an untargeted profit associated with the probability of the user action.

23. The non-transitory computer-readable storage medium of claim 22,
wherein the targeted profit is based on a cost of assisting the user with use of the application and a first number of users adopting the application, and
wherein the untargeted profit is based on a second number of users adopting the application.

24. The non-transitory computer-readable storage medium of claim 22, wherein assisting the user with use of the application involves at least one of:
advising the user to use a question-and-answer system associated with the application; and
prioritizing a question submitted by the user to the question-and-answer system.

\* \* \* \* \*